United States Patent [19]

Eldridge et al.

[11] Patent Number: 5,606,135

[45] Date of Patent: Feb. 25, 1997

[54] CYCLONIC FLOW METERS AND METHOD OF USING SAME

[76] Inventors: Gary Eldridge; Rod Eldridge, both of 17978 Glen Meadow La., Salinas, Calif. 93907

[21] Appl. No.: 438,176

[22] Filed: May 9, 1995

[51] Int. Cl.[6] ............................................. G01F 1/20
[52] U.S. Cl. ............................ 73/861.32; 73/223
[58] Field of Search ................................. 73/75, 77, 79, 73/93, 94, 223, 861, 861.08, 861.32, 861.33, 861.75

[56] References Cited

U.S. PATENT DOCUMENTS

| | | | |
|---|---|---|---|
| 2,778,223 | 1/1957 | Kimbrell | 73/861.55 |
| 3,443,432 | 5/1969 | Shonin et al. | 73/861.32 |
| 4,173,144 | 11/1979 | Pounder | 73/861.79 |
| 4,467,660 | 8/1984 | McMillan, Jr | 73/861.77 |
| 4,782,707 | 8/1988 | Yamazaki et al. | 73/861.32 |

FOREIGN PATENT DOCUMENTS

| | | | |
|---|---|---|---|
| 52-36057 | 3/1977 | Japan | 73/861.32 |
| 1-189519 | 7/1989 | Japan | 73/861.32 |

*Primary Examiner*—Richard Chilcot
*Assistant Examiner*—Max H. Noori

[57] ABSTRACT

Detection of the flow of a fluid, and also measurement of the flow of a fluid, is provided by feeding the fluid flow through a cylindrical chamber to form a cyclonic circulation of the fluid in the chamber. A movable member is moved by the fluid flow. As one example a ball rotates around the inside of the chamber and the passage of the ball detected, at a particular position. An alternative is an annular member also rotated. There can be an optical detection or electronic detection. Output signal can be generated by the movement. Such signals can be processed to give flow rates.

15 Claims, 4 Drawing Sheets

5,606,135

1

CYCLONIC FLOW METERS AND METHOD OF USING SAME

FIELD OF THE INVENTION

This invention relates to apparatus for indicating fluid flow and also for measuring fluid flow, and to a method of indicating fluid flow and for measuring fluid flow.

BACKGROUND OF THE INVENTION

Various forms of apparatus exist for either indicating or measuring fluid flow, or both. Various methods are also known.

Certain disadvantages exist, for example, being subject to clogging, flow rate range limitations, susceptibility to temperature and/or pressure variations, and other problems.

SUMMARY OF THE INVENTION

The present invention provides for the indication of fluid flow, and for the measurement of fluid flow, with high accuracy and avoidance of many of the existing disadvantages.

Broadly, in the present invention, a fluid flow is caused to circulate in a chamber in the flow line, and a member in the chamber is caused to move with the circulating fluid. The movement of a member is monitored, to produce, at the minimum, an indication of its movement and thus an indication of the flow. The movement of the member can be used to produce a signal indicative of the member's speed of movement in the chamber, which signal can be used to give a flow rate measurement.

In one aspect of the invention, a fluid flow indicator and/or flow measuring device comprises a cylindrical chamber having an inlet and an outlet, the inlet positioned at or adjacent to the outer periphery of the chamber and the outlet positioned generally on the axis of the chamber, a movable member located in the chamber and adapted for movement with a fluid flowing in the chamber, and means for determining the movement of the member, for indication of a flow in the chamber. Means can be provided for producing a signal which indicates flow rate.

In another aspect of the invention, a method of indicating and/or measuring fluid flow comprises inputting a flow of fluid into a cylindrical chamber for circulation in the chamber and abstracting the fluid flow from a central position of the chamber, positioning a movable member in the chamber for movement with the fluid flow, determining movement of the member, and producing a signal indicative of the movement of the member. Such a member can further produce an output indicative of the flow rate in the chamber.

BRIEF DESCRIPTION OF THE DRAWINGS

The invention will be readily understood by the following description of certain embodiments of the invention, by way of example, in conjunction with the accompanying diagrammatic drawings, in which.

2

Figure 3:
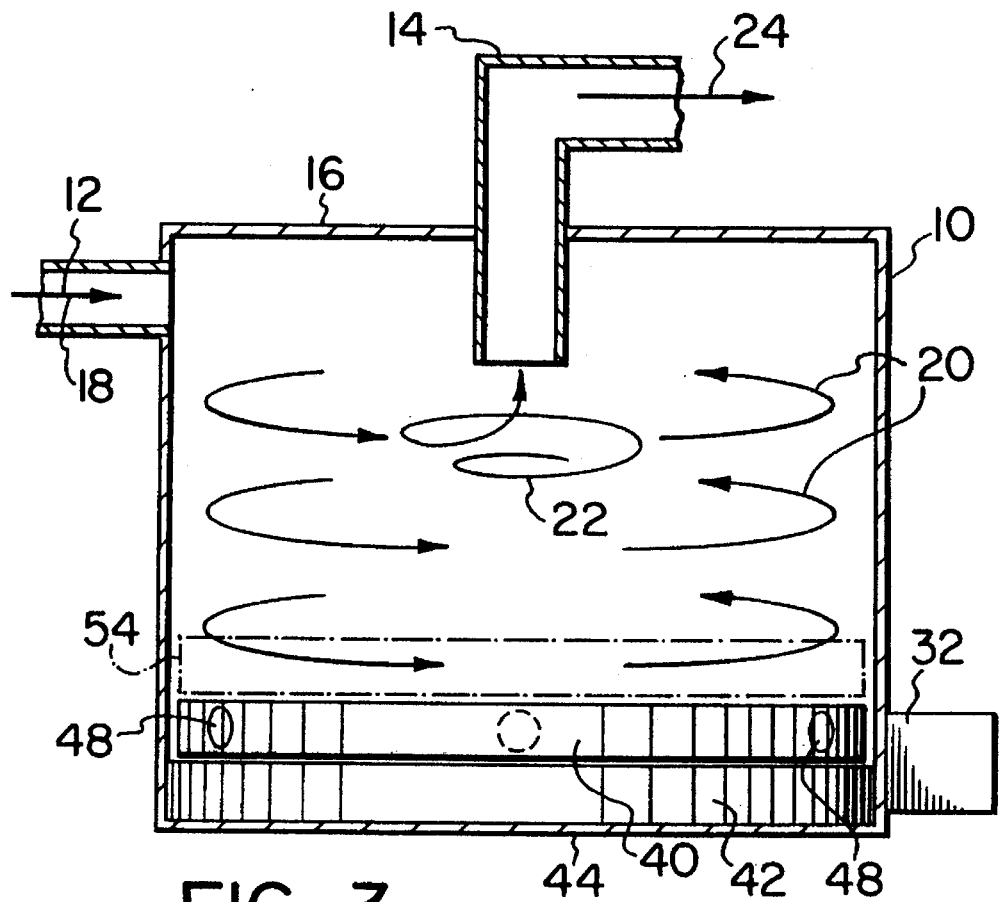
FIG. 3 is a similar cross-section to that of FIGS. 1 and 2, illustrating a further form of apparatus.
Figure 5:
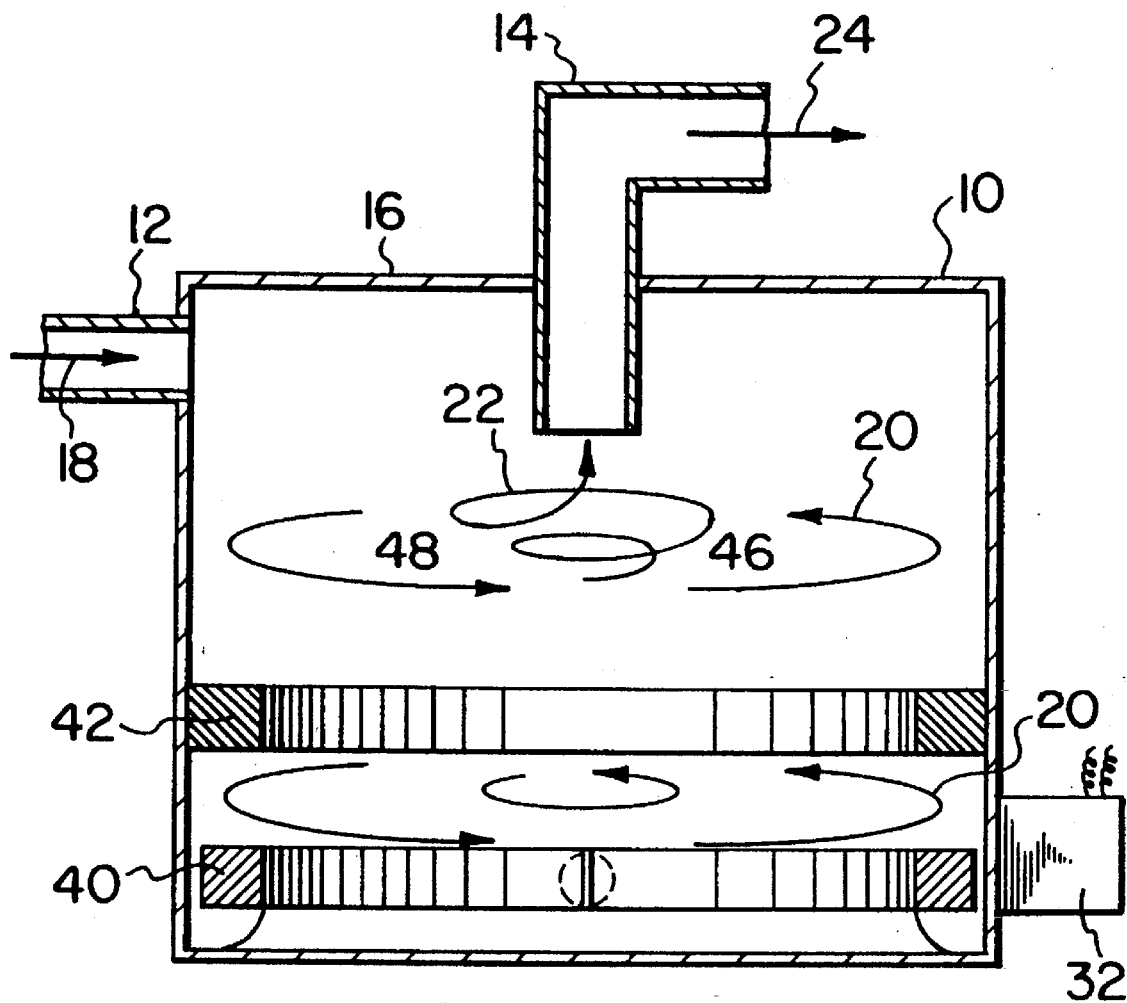
Figure 6:
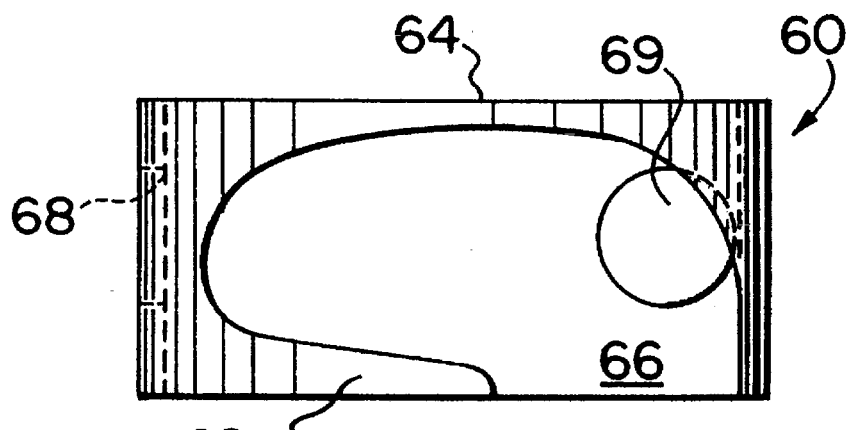

FIG. 5 illustrates a modification on the embodiment illustrated in FIG. 3;

FIG. 6 is a side elevation of one form of vortex shaper; and

Figure 7:
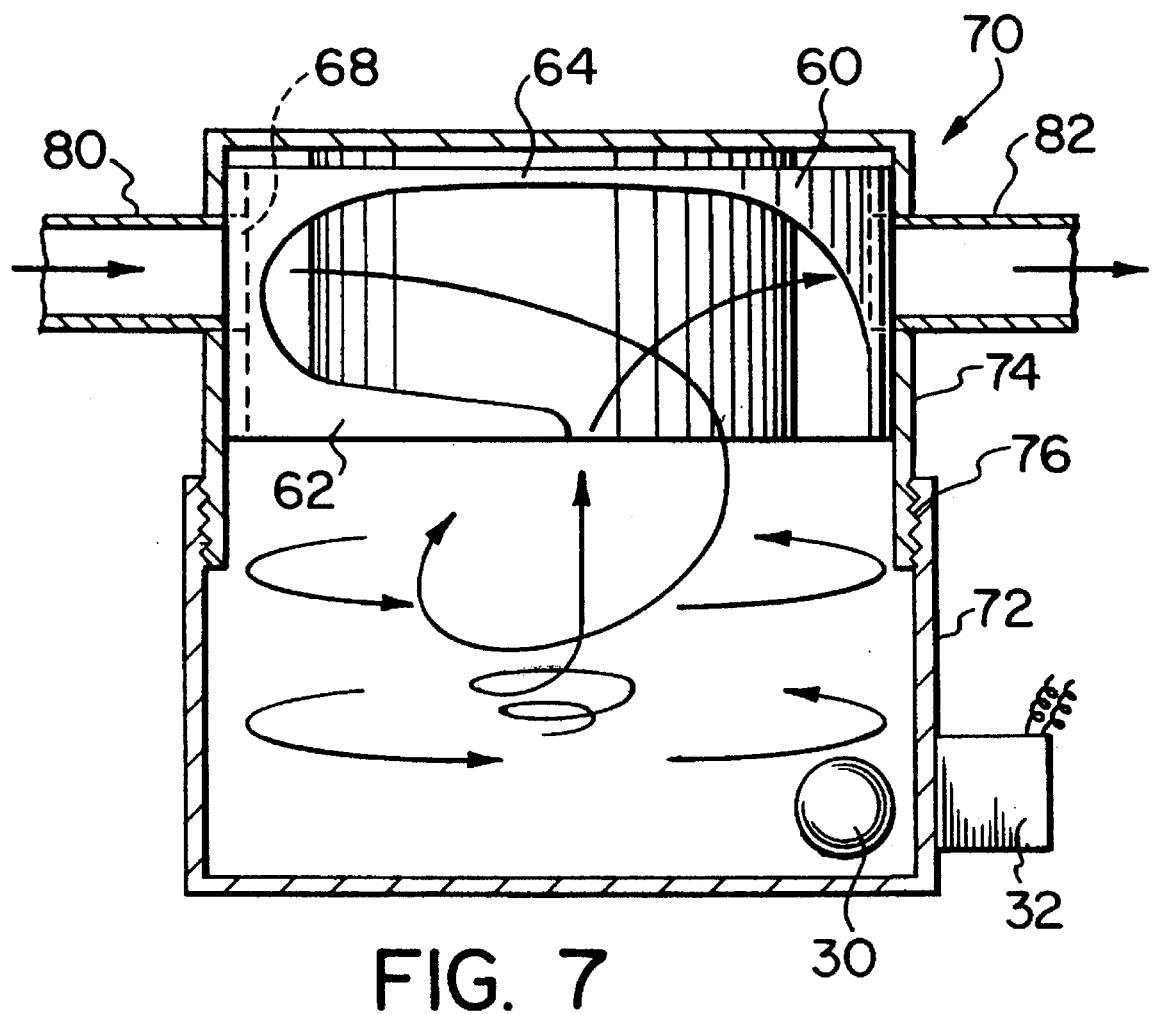

FIG. 7 is a cross-section through a modified form of chamber, with a shaper installed.

Figure 1:
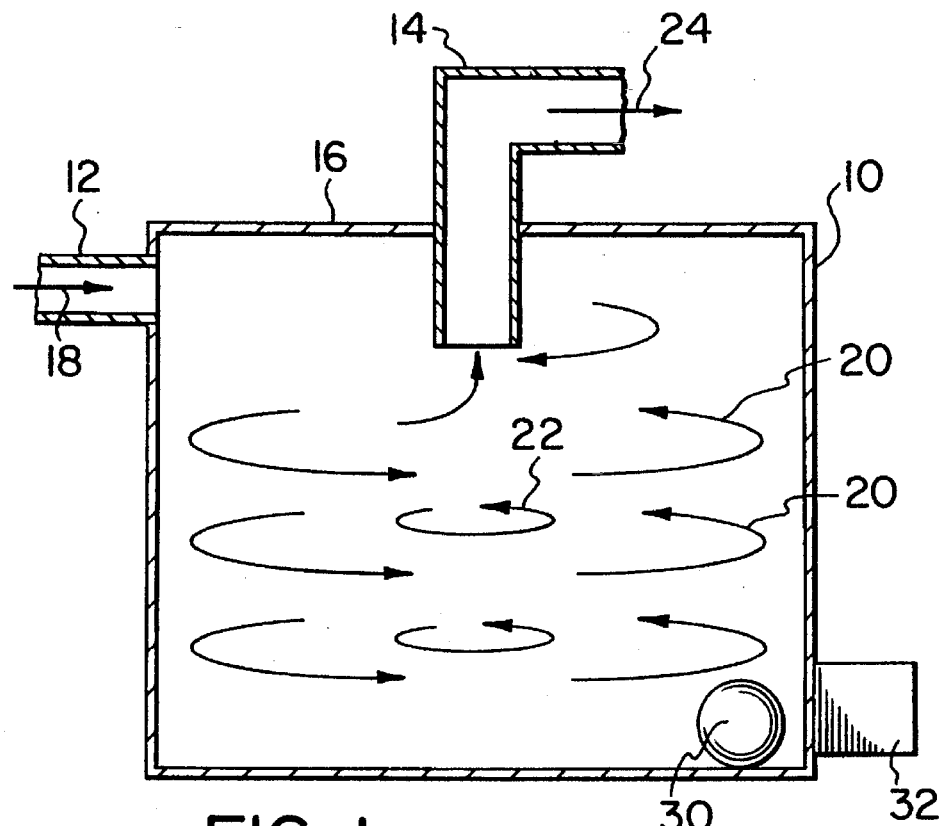
FIG. 1 is a cross-section of the axis of one form of apparatus in accordance with the invention.

As illustrated in FIG. 1, a cylindrical chamber 10 has an inlet 12 and an outlet 14. In the example the inlet is towards the top end 16 of chamber 14 and outlet 14 is on the central axis at the top end. Fluid enters inlet 12, as indicated by arrow 18 and is caused to flow in the chamber in a circulating manner, conveniently referred as cyclonic. This is indicated by arrows 20 and 22, with fluid flowing out of the outlet 14 at 24.

Positioned in the chamber 10 is a ball 30. Ball 30 can be of various materials and can be magnetic or non-magnetic. On the outside of the chamber is positioned a sensor 32, for determining movement of the ball 30.

If the ball is of magnetic material, the sensor can comprise an external "Hall" switch which senses the proximity of the ball each time the ball rotates around the chamber. Typically the ball can be of mildly magnetic stainless steel for corrosion resistance, or the ball can be of any convenient material covered by a corrosion resistant material.

As an alternative the ball can be of glass having a white peripheral surface with the sensor being an optical sensor, which, for example, senses by the reflection of light when the ball passes the sensor. The chamber 10, or at least that part of the chamber wall at the position of the sensor, would be optically transparent.

A further form of sensing is by using a sonic transmitting/receiving signal which measures the thickness of the chamber wall, plus the ball when it is close proximity to the sensor. The signal increases every time the ball circulates past the sensor.

Various other ways of sensing the rotation of the ball can be provided.

Depending upon the desired flow rate to be measured, certain variables can exist, such as the mass of the ball; the outer diameter of the ball, with a greater diameter surface area in contact with the fluid flow; the inner diameter of the chamber, and other variations.

Figure 2:
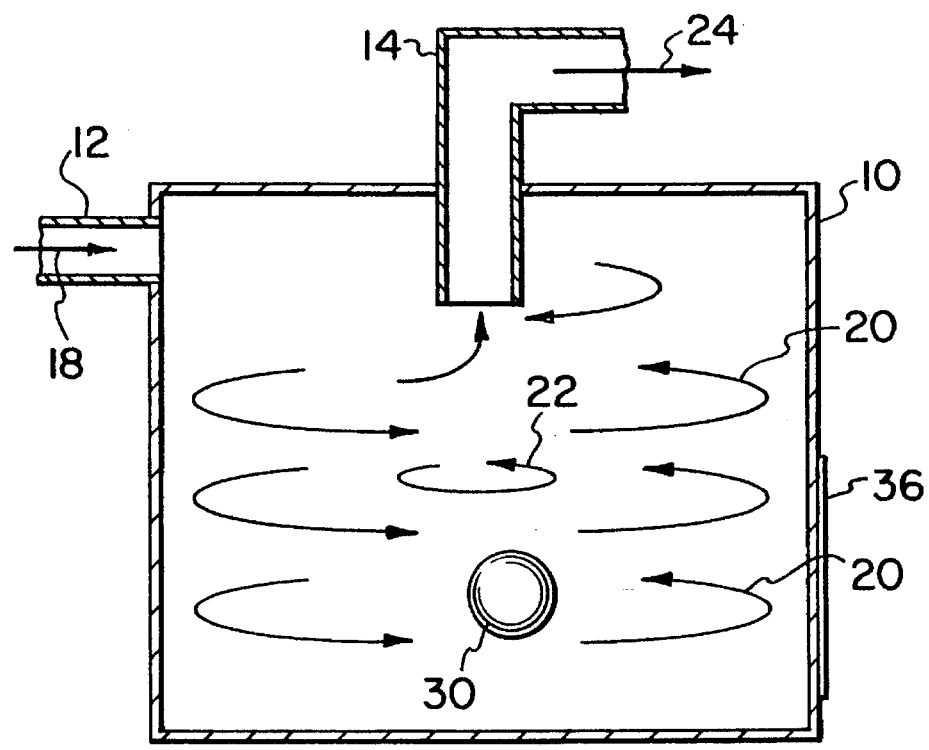
FIG. 2 is a similar cross-section to that of FIG. 1, illustrating an alternative form of apparatus.

It is possible to use visual determination without an external sensor. In FIG. 2, in which common reference numerals are used for items common with FIG. 1, chamber 10 can be of transparent material and the movement of the ball 30 observed. This would provide the basic indication of fluid flow through the chamber.

By the use of a ball 30 of relatively lightweight material, the ball will rise in the center depending upon the flow rate. A suitable scale 36 positioned on the chamber wall can be graduated to give a reading of the flow rate, at the top of the ball, when viewed through the chamber walls. This "viewing" can be done manually or can be carried out by some form of electronic sensing means.

The invention uses a "cyclonic" chamber to create an intentional swirling of the fluid, giving a low pressure area at the center and a high pressure, high velocity stream circulating around the inside of the chamber wall.

Advantage of this "circulating cyclonic flow" include the following: non-obtrusive sensing; self-cleaning and non-clogging; virtually no part wear; temperature and pressure compatible; handles caustic substances; low operating pressure drop; not damaged by over ranging; linear output signal; good rangeability and repeatability; pulsed output.

Typical ranges of flow are from under 1 gpm to over 250 gpm, depending upon chamber and ball sizes specified. The invention can readily be used in lines from ¼ inch input to 2 inch input. The construction can be specialized for other sizes.

There is a wide range of uses of the invention, for example, water utility companies; wastewater treatment plants; petroleum product measurement; caustic fluids/ gases; high temperature steam flow; diary products, such as milk; wineries; medical-volume/pressure breath monitoring; viscosity measurement; boat/airplane speed indicators; flow sensor alarm signalling; and mining-gold-waste separation in swirl chamber.

Figure 4:
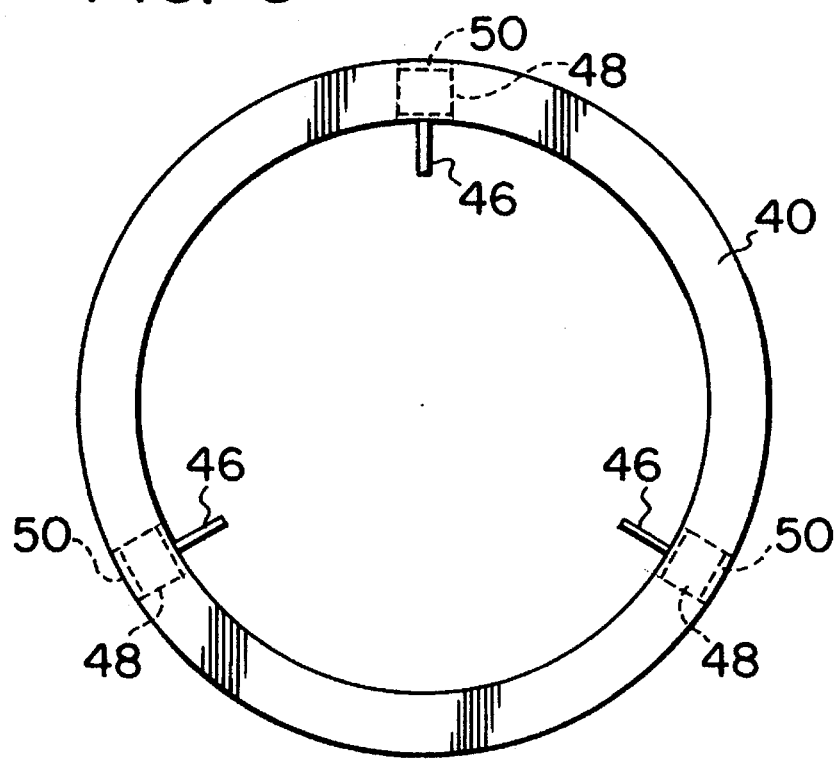
FIG. 4 is a plan view of one form of movable member as used in the apparatus used in FIG. 3.

Instead of the ball 30, other forms of movable member can be used. FIG. 3 illustrates the use of a ring-shaped member 40, FIG. 4 being a plan view of the ring-shaped member. In this example, a movable ring 40 acts in conjunction with a stationary ring 42 which, for example, is attached to the bottom wall 44 of the chamber 10. The movable ring 40 has vanes 46 which cause the ring 40 to rotate as the fluid rotates in the chamber. The vanes can be slightly tilted or inclined, to create a slight downward force in forming a fluid bearing between the movable ring 40 and the stationary ring 42. A fluid bearing is also formed between the outer peripheral wall of the ring 40 and the inner wall surface of the chamber 10.

Inserted into the ring 40 are one or more magnetic members 48. The movement of the members 48 is detected by a sensor 32, as seen in FIG. 1.

A ring type member has less vibration than a ball due to the counterbalanced design. It will function at very high rotating velocities. It is better suited to liquids rather than gases unless the opposed "floatation" surfaces of the movable ring 40 and stationary ring 42 have micro flat surfaces.

The magnetic members 48 can comprise short rods inserted into holes in the member 40, the ends being sealed, at 50, by corrosion resistant material, if desired.

The minimum number of vanes is two, spaced 180° apart, a more ideal being three vanes at 120° apart. More vanes can be used. An example of the tilt of the vanes is from 1° to 5° from a vertical plane.

By the addition of an upper stationary ring, indicated in dotted outline at 54 in FIG. 3, the device can be used with the central axis at an angle to the vertical.

FIG. 5 illustrates a modification of the embodiment illustrated in FIG. 3. In this arrangement, the fixed annular ring is positioned at an intermediate position in the chamber. By positioning the movable ring-shaped member at an intermediate position, for example about half way up the chamber, a higher efficiency is obtained. Also, should there be any heavy particles in the fluid flow, these can drop down to the bottom of the chamber and not interfere with the movable member.

As so far described the vortex or "cyclonic" flow is obtained by inducing the fluid to flow in a circular path. One convenient way of obtaining this is to position the inlet 12 so that it is inclined, for example tangential, to the outer periphery wall of the chamber 10. Another way is to position a vane or deflector at the inner end of the inlet to deflect the flow.

A further arrangement is to provide a member which shapes the vortex flow. This can provide a more efficient apparatus.

A typical example of one form of shaper is illustrated in FIG. 6, while a chamber with a shaper installed is illustrated in FIG. 7.

As illustrated in FIG. 6, and in FIG. 7, the shaper 60 is of a somewhat circular form, with a spiral-shaped wall 62 extending down from a top edge 64. The wall extends downward also at 66. Opposed apertures 68 and 69 are formed through the wall.

In the embodiments illustrated in FIGS. 1 to 3, the chamber has been shown as a unitary member, although normally the chamber would comprise two parts joined together.

FIG. 7 illustrates a modified form of chamber 70 having a base portion 72 and a top portion 74 joined by a threaded joint 76. The shaper 60 is situated in the top portion 74 with the top edge 64 adjacent the top surface 78 of the top portion.

Inlet 80 and outlet 82 are formed in the top portion aligned with the apertures 68 and 69.

The shaper can be a separate member held in the top portion, or can be moulded integrally with the top portion.

The invention provides both an apparatus for and method of detecting flow of fluid by detecting movement of a member caused by movement of the fluid. By means of the "cyclonic" or vortex flow created in the chamber, a high speed flow is created at the inner peripheral surface of the chamber. This in turn creates movement of the movable member. The velocity of the movable member is related to the velocity of the fluid flow. By detecting the movement of the movable member, an output signal can be generated, by conventional means, which output signal is related to the velocity of movable member and thus is related to the velocity of the fluid flow. Suitable treatment of the output signal can provide readings in any desired form.

Initial calibration of a new design will provide a correct correlation between the movement of the movable member and the fluid flow. A high level of accuracy and reproducibility is possible and is obtainable for each produced device to a common design without necessarily recalibrating each device.

Instead of using magnetic detection for the ball 30 or ring-shaped member 40, some form of transponder can be used, reflecting an externally generated signal.

It will be apparent that considerable variations can be made to the basic features of the invention.

We claim:

1. A fluid flow detecting apparatus, comprising:

a cylindrical chamber having a peripheral wall and spaced opposed end walls;

an inlet adjacent one of said end walls, and an outlet;

said inlet adapted to cause a cyclonic flow of fluids to circulate in said chamber;

a movable member in said chamber movable vertically in accordance with changes in fluid flow rate, and means for detecting movement of said movable member.

2. Apparatus as claimed in claim 1, said fluid flow flowing cyclonically and said member moving around on an inner surface of said peripheral wall.

3. A fluid flow detecting apparatus, comprising:

a cylindrical chamber having a peripheral wall and spaced opposed end walls, said end walls spaced sufficiently to facilitate cyclonic flow therebetween;

an inlet adjacent one of said end walls, and an outlet;

said inlet adapted to cause said cyclonic flow of fluids to circulate in said chamber;

a movable annular member positioned in said chamber;

vane means connected to said annular member for contact with said cyclonic flow for converting said cyclonic flow into rotary motion of said annular member about a central axis of said chamber;

at least one signal generating member on said annular member; and means at said peripheral wall for detecting passage of said signal generating member.

4. Apparatus as claimed in claim 1, including a vortex shaping member positioned adjacent said one end of said end walls.

5. Apparatus as claimed in claim 1, wherein said movable member comprises a ball said ball of magnetic material and said means for detecting movement comprising means positioned at said peripheral wall and including means for detecting passage of said ball.

6. Apparatus as claimed in claim 5, said means for detecting passage of said ball including a magnetic detector and means for producing an output signal indicative of the passage of said ball.

7. Apparatus as claimed in claim 1, wherein said means for detecting movement of said ball, comprises an optical device, said optical device including means for detecting reflected light from said movable member, and means for producing an output signal indicative of the passage of said movable member.

8. Apparatus as claimed in claim 4, said chamber comprising two portions, a base portion and a top portion, said inlet and said outlet in said top portion; said vortex shaping member positioned in said top portion.

9. Apparatus as claimed in claim 1, said peripheral wall transparent for at least part of its periphery and a scale for determining movement of said movable member.

10. Apparatus as claimed in claim 3, said signal generating member comprising a magnetic member.

11. Apparatus as claimed in claim 3, said means for producing rotation of said annular member comprising vanes.

12. Apparatus as claimed in claim 11, said vanes inclined to a plane normal to the plane of said annular member, to urge said annular member towards said other end wall.

13. Apparatus as claimed in claim 3, said movable annular member positioned adjacent the other of said end walls.

14. Apparatus as claimed in claim 3, including a fixed annular member positioned intermediate said end walls, said movable annular member positioned on said annular member on a side remote from said other of said spaced end walls.

15. Apparatus as claimed in claim 3, including a fixed annular member spaced from said other end wall, said movable annular member positioned between said fixed annular member and said other end.

* * * * *